(12) United States Patent
Jeong et al.

(10) Patent No.: US 11,277,191 B2
(45) Date of Patent: Mar. 15, 2022

(54) RADIO LINK MONITORING, BEAM RECOVERY AND RADIO LINK FAILURE HANDLING

(71) Applicant: APPLE INC., Cupertino, CA (US)

(72) Inventors: Kyeongin Jeong, Portland, OR (US); Candy Yiu, Portland, OR (US); Dae Won Lee, Portland, OR (US); Yongjun Kwak, Portland, OR (US); Ansab Ali, Hillsboro, OR (US); Youn Hyoung Heo, Seoul (KR)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/487,665

(22) PCT Filed: Mar. 21, 2018

(86) PCT No.: PCT/US2018/023579
§ 371 (c)(1),
(2) Date: Aug. 21, 2019

(87) PCT Pub. No.: WO2018/175593
PCT Pub. Date: Sep. 27, 2018

(65) Prior Publication Data
US 2020/0067589 A1 Feb. 27, 2020

Related U.S. Application Data

(60) Provisional application No. 62/475,692, filed on Mar. 23, 2017.

(51) Int. Cl.
H04B 7/06 (2006.01)
H04B 17/309 (2015.01)
(Continued)

(52) U.S. Cl.
CPC ......... *H04B 7/0695* (2013.01); *H04B 7/0617* (2013.01); *H04B 17/309* (2015.01);
(Continued)

(58) Field of Classification Search
CPC .. H04B 7/0695; H04B 17/309; H04B 7/0617; H04W 76/19; H04W 24/10; H04W 28/04; H04W 72/042
See application file for complete search history.

(56) References Cited

U.S. PATENT DOCUMENTS

2016/0353510 A1 12/2016 Zhang et al.
2017/0230780 A1\* 8/2017 Chincholi ............... H04W 4/70
(Continued)

OTHER PUBLICATIONS

3GPP TS 38.213, "3rd Generation Partnership Project; Technical Specification Group Radio Access Network; NR; Physical layer procedures for control (Release 15)", V15.0.1, Mar. 2018, 76 pages.
(Continued)

*Primary Examiner* — Dac V Ha
(74) *Attorney, Agent, or Firm* — Stoel Rives LLP

(57) ABSTRACT

Apparatuses of wireless communication devices are disclosed. An apparatus of a user equipment includes one or more processors configured to start a first timer responsive to detection of a Radio Link (RL) failure, start a second timer and trigger a beam recovery procedure one or more times responsive to expiry of the first timer if RL recovery is not detected, and start a third timer and attempt to find a suitable cell for Radio Resource Control (RRC) connection reestablishment responsive to one or more expiries of the second timer if RL recovery fails. The one or more processors are also configured to go to an RRC idle or inactive state responsive to expiry of the third timer if a suitable cell for RRC connection reestablishment is not found.

12 Claims, 12 Drawing Sheets

(51) Int. Cl.
*H04W 76/19* (2018.01)
*H04W 24/10* (2009.01)
*H04W 28/04* (2009.01)
*H04W 72/04* (2009.01)

(52) U.S. Cl.
CPC .......... *H04W 24/10* (2013.01); *H04W 28/04* (2013.01); *H04W 76/19* (2018.02); *H04W 72/042* (2013.01)

(56) References Cited

U.S. PATENT DOCUMENTS

| | | | | |
|---|---|---|---|---|
| 2018/0324780 | A1* | 11/2018 | Novlan | H04L 43/0811 |
| 2019/0052342 | A1* | 2/2019 | Maattanen | H04B 7/0695 |
| 2019/0199615 | A1* | 6/2019 | Zhang | H04L 43/16 |
| 2019/0327634 | A1* | 10/2019 | Lee | H04W 80/08 |
| 2019/0363910 | A1* | 11/2019 | Ugurlu | H04L 5/0051 |

OTHER PUBLICATIONS

Intel, "CR to TS38.133", R4-1803513, 3GPP TSG-RAN4 Meeting #86, Athens, Greece, V 15.0.0, Feb. 26, 2018, 64 pages.
Mediatek Inc., "RLM and RLF in HF NR", R2-1700898 (Revision of R2-1700246), 3GPP TSG-RAN WG2 #97, Athens, Greece, Agenda Item 10.3.1.1.5, Feb. 13-17, 2017, 5 pages.
PCT/US2018/023579, International Search Report and Written Opinion, dated Jun. 21, 2018, 18 pages.

\* cited by examiner

US 11,277,191 B2

RADIO LINK MONITORING, BEAM RECOVERY AND RADIO LINK FAILURE HANDLING

RELATED APPLICATIONS

This application is a non-provisional of U.S. Provisional Patent Application No. 62/475,692, filed Mar. 23, 2017, which is incorporated by reference herein in its entirety.

BACKGROUND

Various embodiments generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth, such as particular structures, architectures, interfaces, techniques, etc., in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

As used herein, the term "Layer 1," or equivalently "L1," refers to a physical layer of a cellular data network. As used herein, "Layer 2," or equivalently "L2," refers to a Media Access Control (MAC) layer of the cellular data network. As used herein, the term "Layer 3," or equivalently "L3," refers to a Radio Resource Control (RRC) layer of the cellular data network.

As used herein, the term 3GPP stands for "3rd Generation Partnership Project," and refers to a group or entity that issues standards (e.g., "telecommunications standards," or "TSs") used to govern the use of cellular data networks, such as Long Term Evolution (LTE) cellular data communication network protocols and New Radio (NR) (or equivalently "5G"), and other future wireless communication network protocols beyond LTE. Reference to 3GPP TSs made herein refer to version 14.1.0 of the 3GPP standards.

In the 3GPP LTE system, radio link monitoring (RLM), radio link failure (RLF) detection and Radio Link (RL) re-establishment procedures are defined in 3GPP TS 36.133, titled "E-UTRA Requirements for support of radio resource management," and TS 36.331, titled "E-UTRA RRC Protocol Specification."

Figure 1:
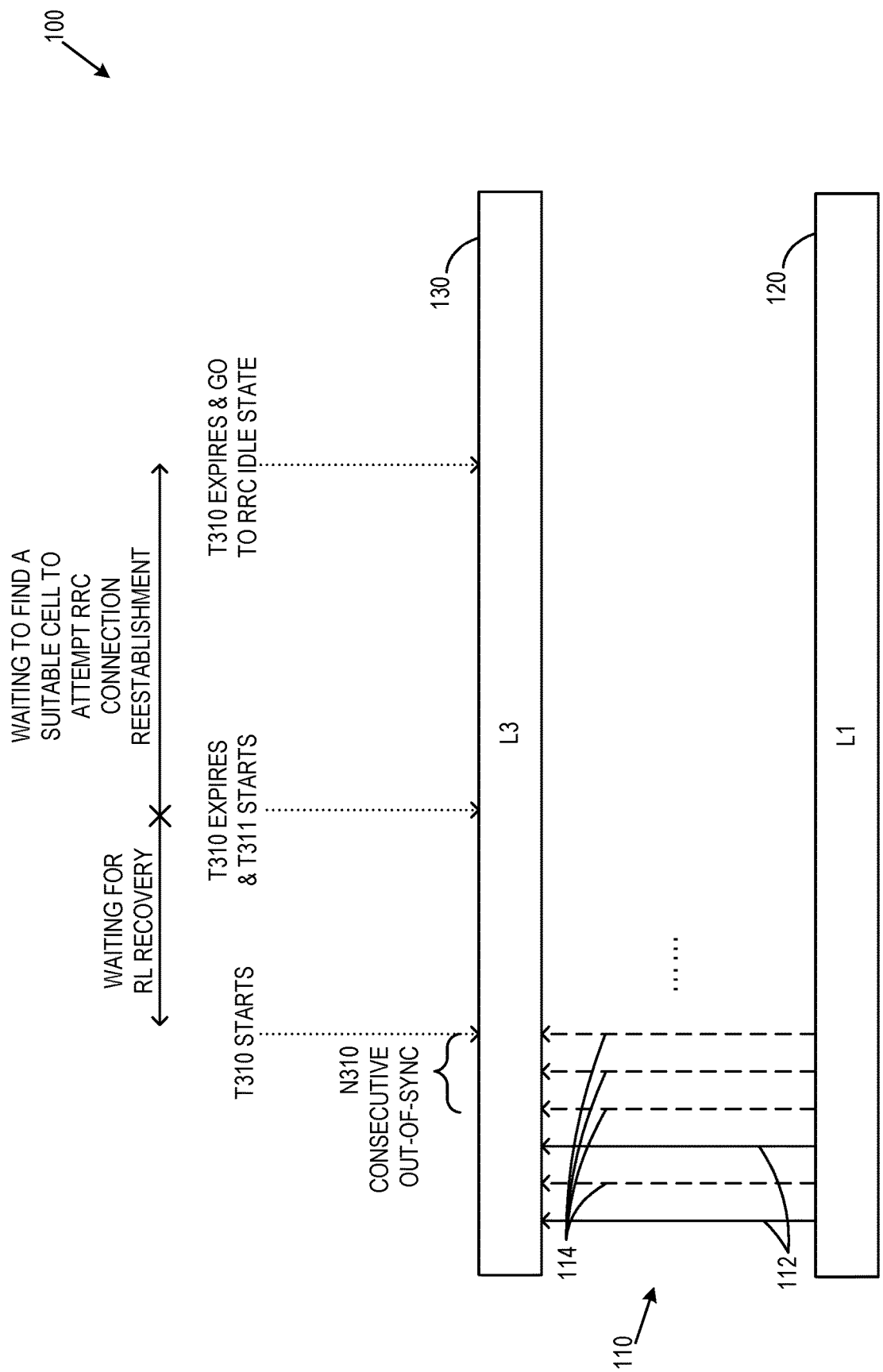
FIG. 1 is a simplified signal timing diagram of Radio Link Monitoring (RLM) and Radio Link Failure (RLF) detection and handling.

FIG. 1 is a simplified signal timing diagram 100 of RLM and RLF detection and handling, according to 3GPP TS 36.133 and 3GPP TS 36.331. FIG. 1 shows brief inter-layer interactions 110 and the corresponding User Equipment (UE) procedures for RLM and RLF handling. L1 120 periodically sends in-sync indications 112 and out-of-sync indications 114 to L3 130. "In-sync" status or "out-of-sync" status of the indications 112, 114 is determined based on Cell Specific Reference (CRS) channel quality and the associated hypothetical Physical Downlink Control Channel (PDCCH) block error ratio. More details can be seen in TS 36.133.

If L3 130 receives a number N310 of consecutive out-of-sync indications 114 (e.g., N310 may be three consecutive out-of-sync indications 114), timer T310 starts running to wait for RL recovery (e.g., which may correspond to a number N311 of consecutive in-sync indications 112 received). If T310 expires, timer T311 starts to find out a suitable cell to attempt RRC connection re-establishment. If T311 expires without the UE finding a suitable cell to attempt RRC connection re-establishment, the UE enters to an RRC idle state. For more detailed information on RLF detection and RRC connection re-establishment, see TS 36.331. Also, detailed information on the definition of a suitable cell can be found in TS36.304, titled "E-UTRA UE procedures in idle mode."

In 3GPP, NR for future wireless communication beyond LTE is under study. One of the target frequency bands is a very high frequency band, and due to high frequency band characteristics (e.g. high attenuation, etc.) transmission mechanisms to provide sufficient reliability and coverage are also under study. One candidate transmission mechanism is to transmit user data and/or control information via a direct narrow beam or plurality of beams (which may be simply referred to hereinafter as "beam" to refer to single or plural beams).

Figure 2:
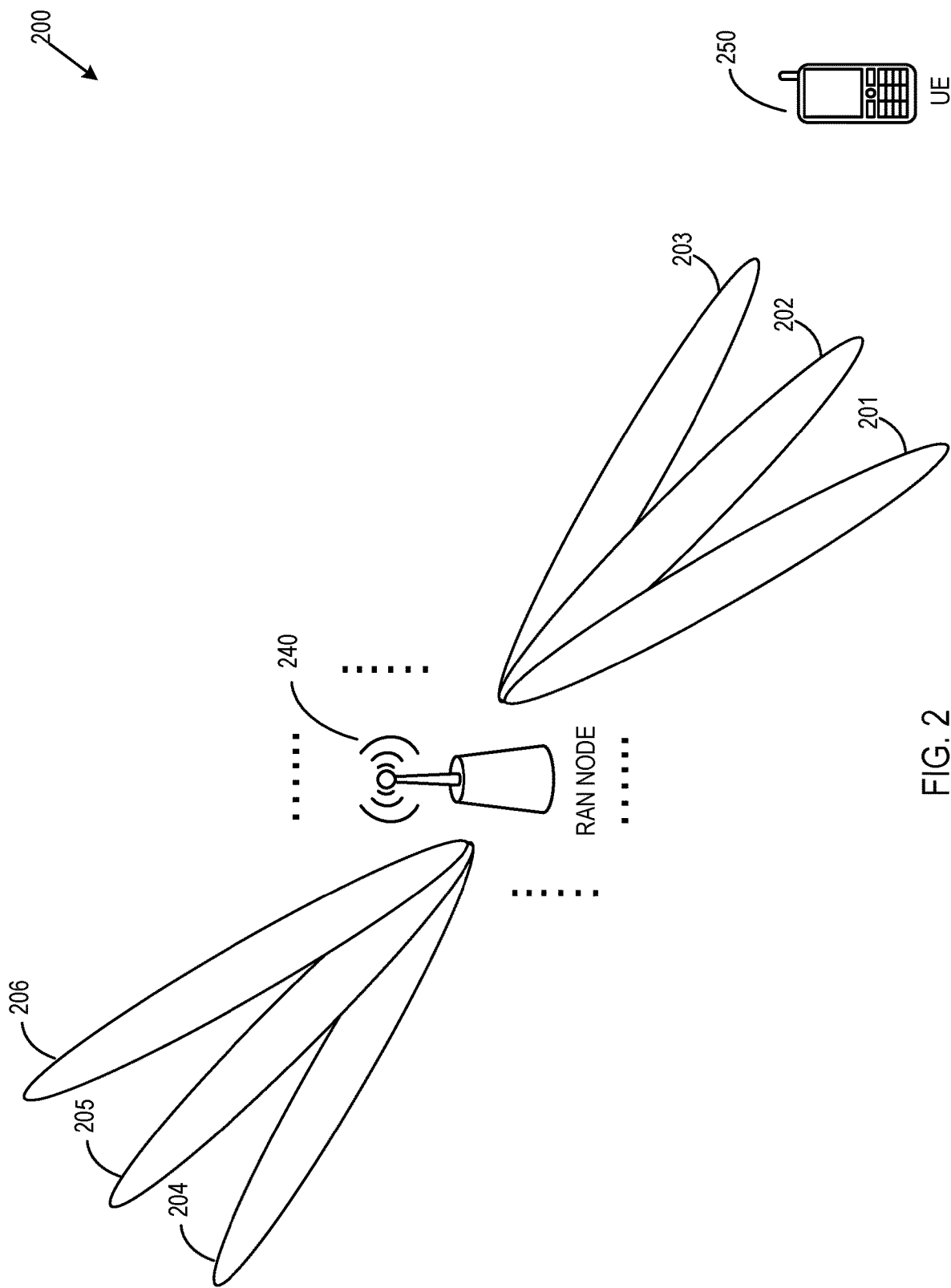
FIG. 2 is a simplified illustration of a portion of a cellular data communication system, according to some embodiments.

FIG. 2 is a simplified illustration of a portion of a cellular data communication system 200, according to some embodiments. FIG. 2 shows an example of some direct narrow beams 201, 202, 203, 204, 205, and 206 to enable communication between a Radio Access Network (RAN) node 240 (e.g., an NR-NodeB, or equivalently "NR-NB," next generation Node B, or equivalently "gNB," etc.) and a UE 250. In order to cover the coverage and direction within a cell, a total of more than the six beams 201, 202, 203, 204, 205, and 206 illustrated in FIG. 2 may be used (only six beams are shown to avoid cluttering FIG. 2). Depending on a location of the UE 250 and/or its channel condition, only some of beams 201-206 may be used for transmissions (e.g., in FIG. 2, only beams 201-204 may be candidate beams for actual data and/or control information transmissions). Each direct narrow beam 201-206 may carry PDCCH information including scheduling information (e.g., including time and frequency resource information, Modulation and Coding Scheme (MCS) information, Hybrid Automatic Repeat Request (HARQ) related information, transmission power related information, etc.) and actual user data and/or control information over an assigned resource.

Beam-based operation becomes mainstream in the 3GPP NR system, especially in the high frequency band. In beam-based communication, one issue that arises is how to perform RLM and RLF detection, and RLF handlings in connection with the beam-level failure detection and beam-level recovery.

Embodiments disclosed herein relate to radio link monitoring, beam recovery and radio link failure handling mechanisms, such as:

Radio link monitoring and in-sync and out-of-sync indications are used for both beam recovery and radio link failure declaration and handling.

When L3 receives N #1 number of (consecutive) out-of-sync indications from L1, T #1 Timer starts running and if T #1 expires T #2 Timer starts running and L3 triggers beam recovery procedure to L1/L2. When T #2 expires T #2 restarts running and L3 triggers beam recovery procedure to L1/L2. While T #2 runs, if L3 receives N #2 (consecutive) in-sync indications from L1, the UE considers that the beam is recovered and stops T #2.

When L3 has triggered beam recovery procedure to L1/L2 N #3 number of times but has not received N #2 (consecutive) in-sync indications from L1, T #3 Timer starts running. The UE attempts to find out a suitable cell to attempt RRC connection re-establishment while T #3 runs, and if T #3 expires, the UE goes to RRC idle state.

Figure 3:
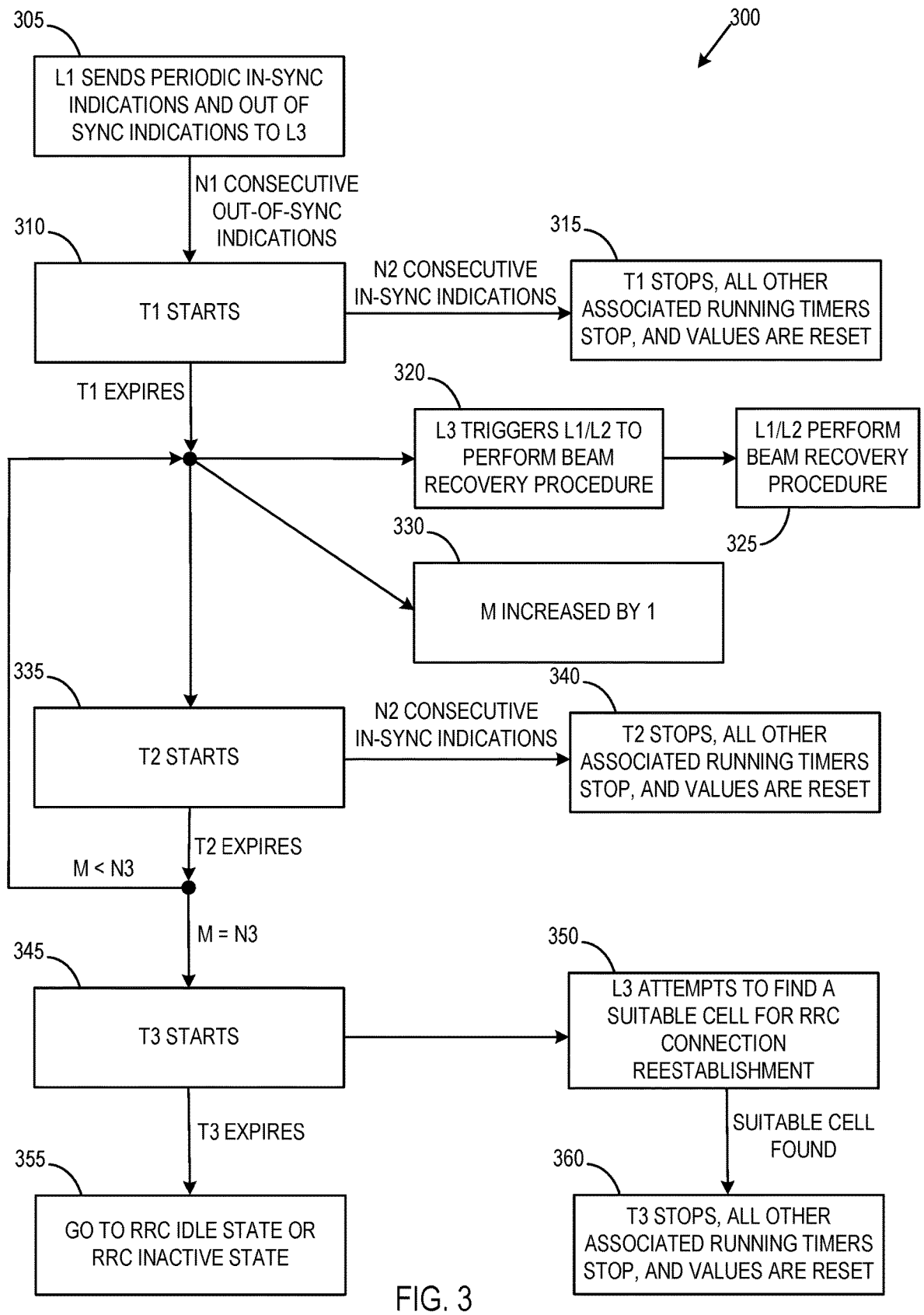
FIG. 3 is a simplified flowchart illustrating a method of operating a cellular data communication system, according to some embodiments.

FIG. 3 is a simplified flowchart illustrating a method 300 of operating a cellular data communication system, according to some embodiments. The embodiments disclosed herein include one or more of acts 305-360 of FIG. 3. The acts 305-360 of method 300 relate to RLM, beam recovery, and RLF detection and handlings.

The method 300 includes L1 sending 305 periodic in-sync indications and out-of-sync indications to L3. A determination as to whether these indications are in-sync or out-of-sync is determined based on (i) the channel quality of the best measured beam among the multiple beams, which are configured as the candidate beams to serve the UE, and/or (ii) the hypothetical PDCCH block error ratio, which is associated with the channel quality from (i).

If it is determined that a number N1 (e.g., three) of consecutive out-of-sync indications is received by L3 from L1, Timer 1 (T1) starts 310. While T1 runs, if L3 receives a number N2 of consecutive in-sync indications from L1, T1 stops 315, all other associated running timers stop, and values of the timers are reset. When T1 expires, Timer 2 (T2) starts 335, L3 triggers 320 L1/L2 to perform a beam recovery procedure (e.g., by using uplink (UL) scheduling request channel or UL Sounding Reference Signal (SRS) or UL Random Access Channel (RACH)), and value M is increased 330 by one (e.g., initial M value=0).

When L1/L2 receives the triggering 320 of the beam recovery procedure from L3, L1/L2 performs 325 the corresponding beam recovery procedure. By way of non-limiting example, the UE may attempt to transmit some control information (e.g., UE ID and/or indication that beam-level failure is detected and/or indication of which downlink beam is detected with the sufficient radio condition/measured result, etc.) over all possible beams in the uplink.

While T2 runs, if L3 receives the number N2 of consecutive in-sync indications from L1, T2 stops 340, all other associated running timers stop, and values are reset. When T2 expires, and if M<N3 (N3 is a configured number of beam-recovery procedure times), L3 triggers 320 L1/L2 to perform the beam recovery procedure, M is increased 330 by one, and T2 restarts 335. When L1/L2 receives the triggering 320 of the beam recovery procedure from L3, L1/L2 performs 325 the corresponding beam recovery procedure.

While T2 runs, if L3 receives the number N2 of consecutive in-sync indications from L1, T2 stops 340, all other associated running timers stop, and values are reset. When T2 expires, if M<N3, T2 restarts 335, L3 triggers 320 L1/L2 to perform beam recovery procedure, and M is increased 330 by one as discussed above. If, however, M=N3 when T2 expires, Timer 3 (T3) starts 345 and L3 attempts 350 to find out a suitable cell to attempt RRC connection re-establishment. While T3 runs, if a suitable cell is found, T3 stops 360, all other associated running timers stop, and values are reset. When T3 expires, the device goes 355 to an RRC idle state or an RRC inactive state.

As discussed above, T1, T2 and T3 are timers, and N1, N2 and N3 are numbers. These timers and numbers can be either configured by the network or fixed by the specification in the telecommunication standards.

The following modifications can also be taken into account in various embodiments:

T2 can be replaced by T1.

M can be increased at the first time after the first T2 expires.

After T1 expires, L3 may not trigger beam-recovery procedure to L1/L2.

In the following cases, L3 indicates ending of beam recovery procedure to L1/L2, and L2/L2 stops beam recovery procedure when it receives ending of beam recovery procedure indication from L3:

Case 1: while T2 runs, if L3 receives N2 number of in-sync indications from L1;

Case 2: while T2 runs, if L3 receives an RRC connection reconfiguration message including new candidate beams to serve the UE (i.e. L3 receives control message to recover beam(s) from the network);

Case 3: when T3 starts.

Instead of N3, a new timer T4 (duration the UE attempts beam recovery) can be applied. In that case, the above procedures may be modified as follows:

T4 starts either when T1 starts or when T1 expires;

remove the procedure to increase M by one in act 330;

when T2 expires and if T4 runs, acts 320-335 are performed;

when T4 expires, act 345 is performed.

Also, in some embodiments, instead of L3 triggering 320 of beam recovery to L1/L2 upon every T1 and/or T2 expiry, L3 indicates triggering 320 of beam recovery procedure and ending of beam recovery procedure to L1/L2 separately. In that case, M and N3 may not need to be considered. The above method 300 may be modified as follows:

Remove the procedure to increase M by one in act 330.

When L1/L2 receives triggering of beam recovery procedure from L3, the L1/L2 performs 325 beam recovery procedure and repeats/continues it until L1/L2 receives ending of beam recovery procedure from L3.

While T2 runs, if L3 receives the number N2 of consecutive in-sync indications from L1, act 340 may be modified to instead state that T2 stops 340, all other associated running timers stop, values are reset, and L3 indicates ending of beam recovery procedure to L1/L2. Acts of the method 300 that relate to T2 and T3 may be modified as follows:

when T2 expires, T3 starts 345, L3 indicates ending of beam recovery procedure to L1/L2, and L3 attempts 350 to find a suitable cell to attempt RRC connection reestablishment;

while T3 runs, if a suitable cell is found, T3 stops 360, all other associated running timers stop, and values are reset;

when T3 expires, go 355 to RRC idle state or RRC inactive state.

Figure 4:
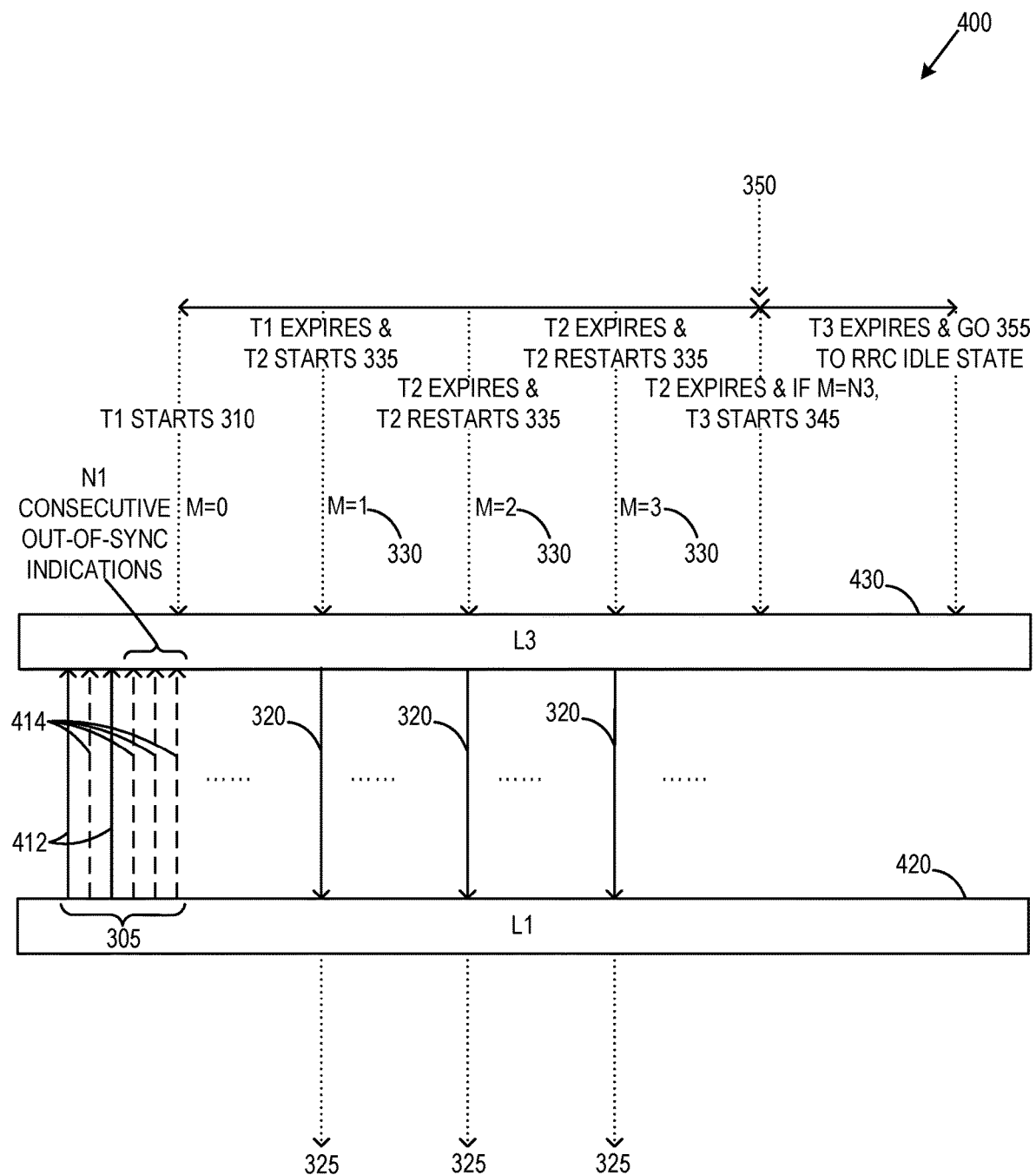
FIG. 4 is a simplified signal timing diagram of a cellular data communication system, according to some embodiments.

FIG. 4 is a simplified signal timing diagram 400 of a cellular data communication system, according to some embodiments. FIG. 4 illustrates an example embodiment related to RLM, beam failure detection, beam recovery procedure, and RLF detection and handlings. Referring to FIGS. 3 and 4 together, L1 420 sends 305 periodic in-sync indications 412 and out-of-sync indications 414 to L3 430. These indications are determined to be in-sync and out-of-sync based on: (i) the channel quality of the best measured beam among the multiple beams which are configured as the candidate beams to serve the UE 250, and/or (ii) the hypothetical PDCCH block error ratio which is associated with the channel quality from (i). For instance, in FIG. 2 above, if we assume beams 201-203 are configured as the candidate beams to serve the UE 250, in-sync indications 412 and out-of-sync indications 414 are generated based on the best measured beam among beams 201-203. If (ii) is used, L1 420 calculates the hypothetical PDCCH block error ratio with the measured result on the best one of beams 201-203.

In FIG. 4 it is assumed that N1 is configured as 3 (which is a non-limiting example, as N1 may be selected to be any positive integer), so when L3 430 receives three consecutive out-of-sync indications 414 from L1 420, T1 starts 310 running. While T1 runs, if L3 430 receives the number N2 of consecutive in-sync indications 412 from L1 420, T1 stops 315, all other associated running timers stop, and values are reset. The illustration of FIG. 4 is the result from not receiving N2 consecutive in-sync indications 412 (i.e., the condition to stop 315 T1 is not met), so FIG. 4 shows that T1 will expire. When T1 expires, T2 starts 335 and L3 430 triggers 320 L1/L2 to perform the beam recovery procedure. By way of non-limiting example, if a random access channel is used for beam recovery purpose, L3 430 may trigger 320 the beam recovery procedure to L2 (MAC layer), but if some physical control channel (e.g., scheduling request, sounding reference signal, etc.) is used for beam recovery purpose, L3 430 may trigger 320 the beam recovery procedure to L1 420 (PHY layer). Also, M is increased 330 by one. Here it is assumed that an initial value of M is zero, so after the first instance of L3 430 triggering 320 L1/L2 for beam recovery, M is increased 330 to 1.

When L1/L2 receives that triggering indication from L3 430, it performs 325 the beam recovery procedure. It should be noted that the beam recovery procedure in L1/L2 may be performed 325 before T2 expires. By way of non-limiting example, the attempt to send the required information (e.g. UE ID, indication that beam-level failure is detected or beam recovery is needed, indication which downlink beams are detected with the sufficient radio condition/measured result, etc.) to the network for beam recovery via SR channel/SRS/RACH over all uplink beams can be done at least once before T2 expires. In that case, L1/L2 may not need to repeat/continue the beam recovery procedure unless L1 420 receives new triggering 320 of beam recovery procedure from L3 430. It should be noted that, in some embodiments, repetition/continuation of the beam recovery procedure (i.e., attempting beam recovery procedure multiple times) until T2 expires is also considered.

While T2 runs, if L3 430 receives the number N2 of consecutive in-sync indications 412 from L1 420, T2 stops 340, all other associated running timers stop and values are reset. In FIG. 4 it is assumed that L3 430 does not receive the number N2 of consecutive in-sync indications 412 (i.e., the condition to stop T2 is not met), so T2 will expire. Until the number of attempts for beam recovery (M) is equal to N3, T2 restarts 335, M is increased 330 by one, and L3 430 triggers 320 L1/L2 beam recovery procedure whenever T2 expires unless the condition to stop 340 T2 is met. When M is equal to N3 and T2 expires, T3 starts 345 running and L3 430 attempts 350 to find out a suitable cell to attempt RRC connection re-establishment. If a suitable cell is found, T3 stops 360 (FIG. 3); otherwise, if T3 expires, the UE goes 355 to an RRC idle or inactive state, as shown in FIG. 4.

It should be noted that during the time between when T1 starts 310 and when T3 starts 345, the UE is waiting for RL recovery, which may occur if N2 consecutive in-sync indications 412 occur. After T3 starts 345 and until T3 expires, however, the UE waits to find a suitable cell with which to attempt RRC connection re-establishment.

Figure 5:
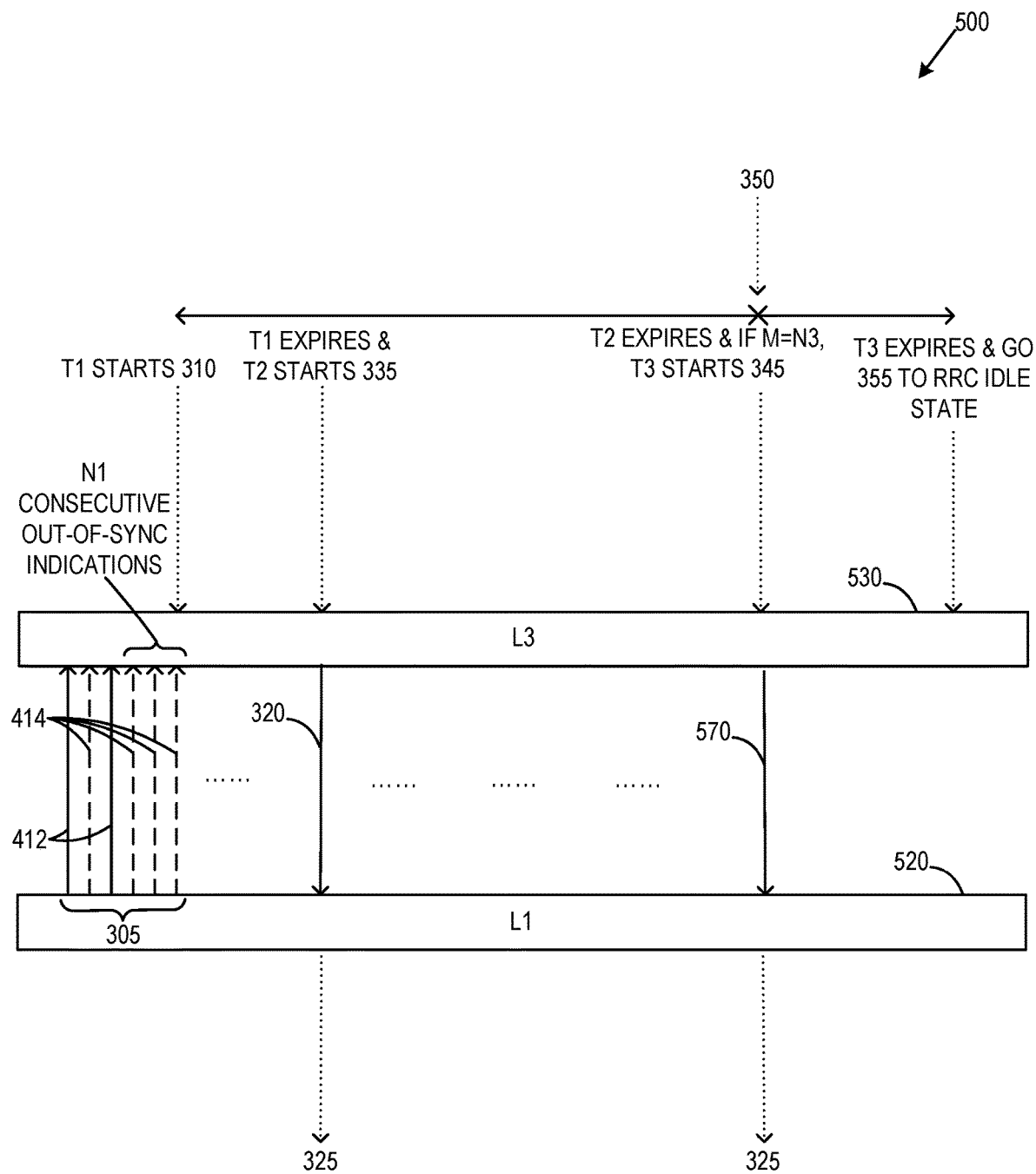
FIG. 5 is a simplified signal timing diagram of a cellular data communication system, according to some embodiments.

FIG. 5 is a simplified signal timing diagram 500 of a cellular data communication system, according to some embodiments. FIG. 5 illustrates another example embodiment related to RLM, beam failure detection, beam recovery procedure, and RLF detection and handlings. Referring to FIGS. 3 and 5 together, in FIG. 5, up to item "T1 expires and T2 starts 335," the same procedures as those described in FIG. 4 are applied.

When T1 expires and T2 starts 335, L3 530 triggers 320 beam recovery procedure to L1/L2 and L1/L2 performs 325 the beam recovery procedure when it receives the triggering 320 of the beam recovery procedure from L3 430, and L1/L2 repeats/continues the beam recovery procedure until the reception 570 of an ending beam recovery procedure instruction from L3 530. L3 530 indicates ending beam recovery procedure to L1/L2 in the following cases: case (i) when T2 expires and T3 starts 345, case (ii) when L3 530 receives the number N2 of consecutive in-sync indications 412 from L1 520, case (iii) when L3 530 receives an RRC message to cover beam(s) from the network. Cases (ii) and (iii) are not shown in FIG. 5. Rather, FIG. 5 illustrates case (i): that T2 expires and T3 starts 350.

Once T3 starts 345, the UE attempts 350 to find out a suitable cell to attempt RRC connection reestablishment. If a suitable cell is found, T3 stops 360 and RRC connection reestablishment is attempted to the cell; otherwise, if T3 expires, the UE goes 355 into an RRC idle or inactive state, as shown in FIG. 5.

Figure 6:
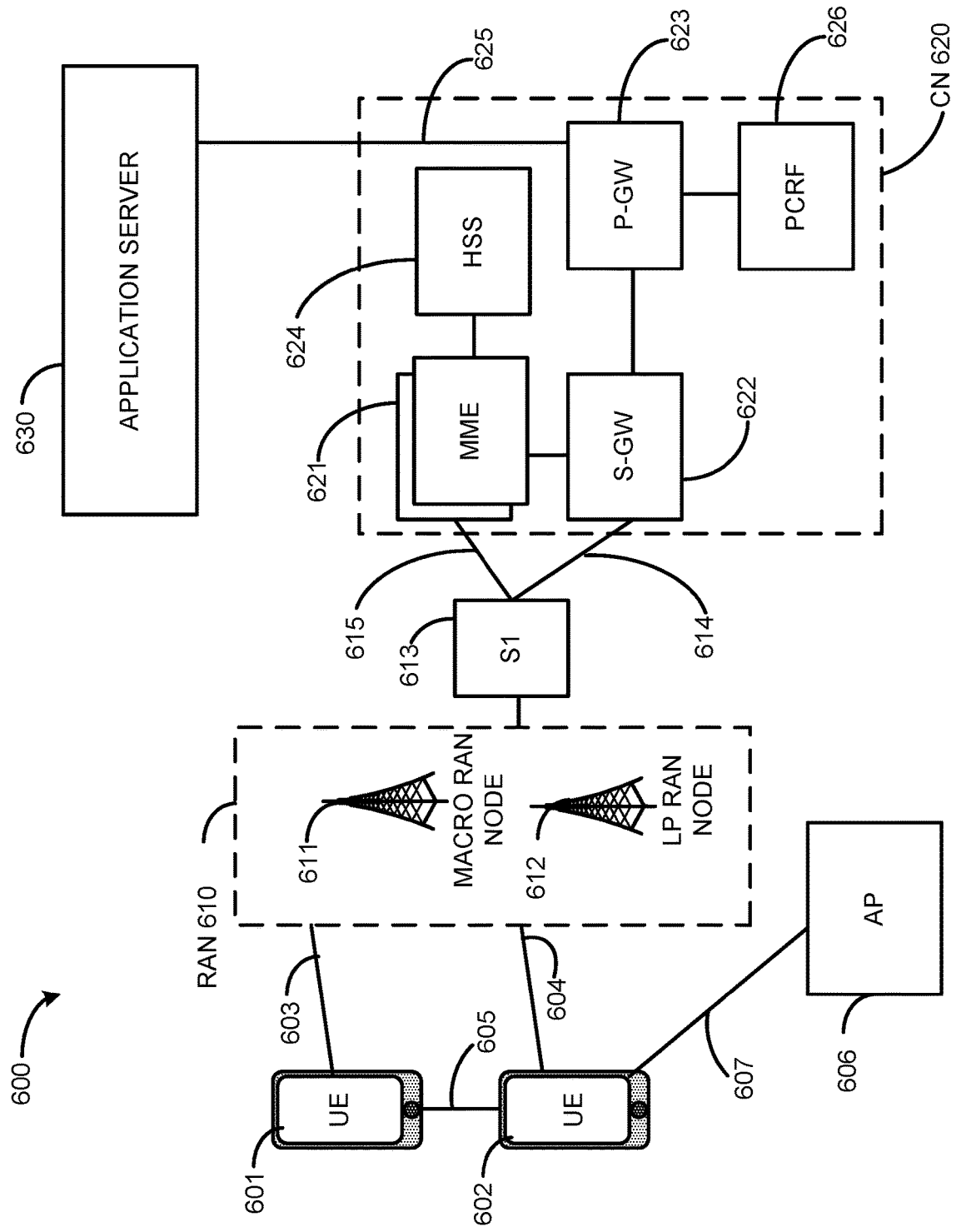
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 may be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and a serving gateway (S-GW) 622, and an S1-mobility management entity (MME) interface 615, which is a signaling interface between the RAN nodes 611 and 612 and MMEs 621.

In this embodiment, the CN 620 comprises the MMEs 621, the S-GW 622, a Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the CN 620 (e.g., an EPC network) and external networks such as a network including the application server 630 (alternatively referred to as application function (AF)) via an Internet Protocol (IP) interface 625. Generally, an application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. A Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
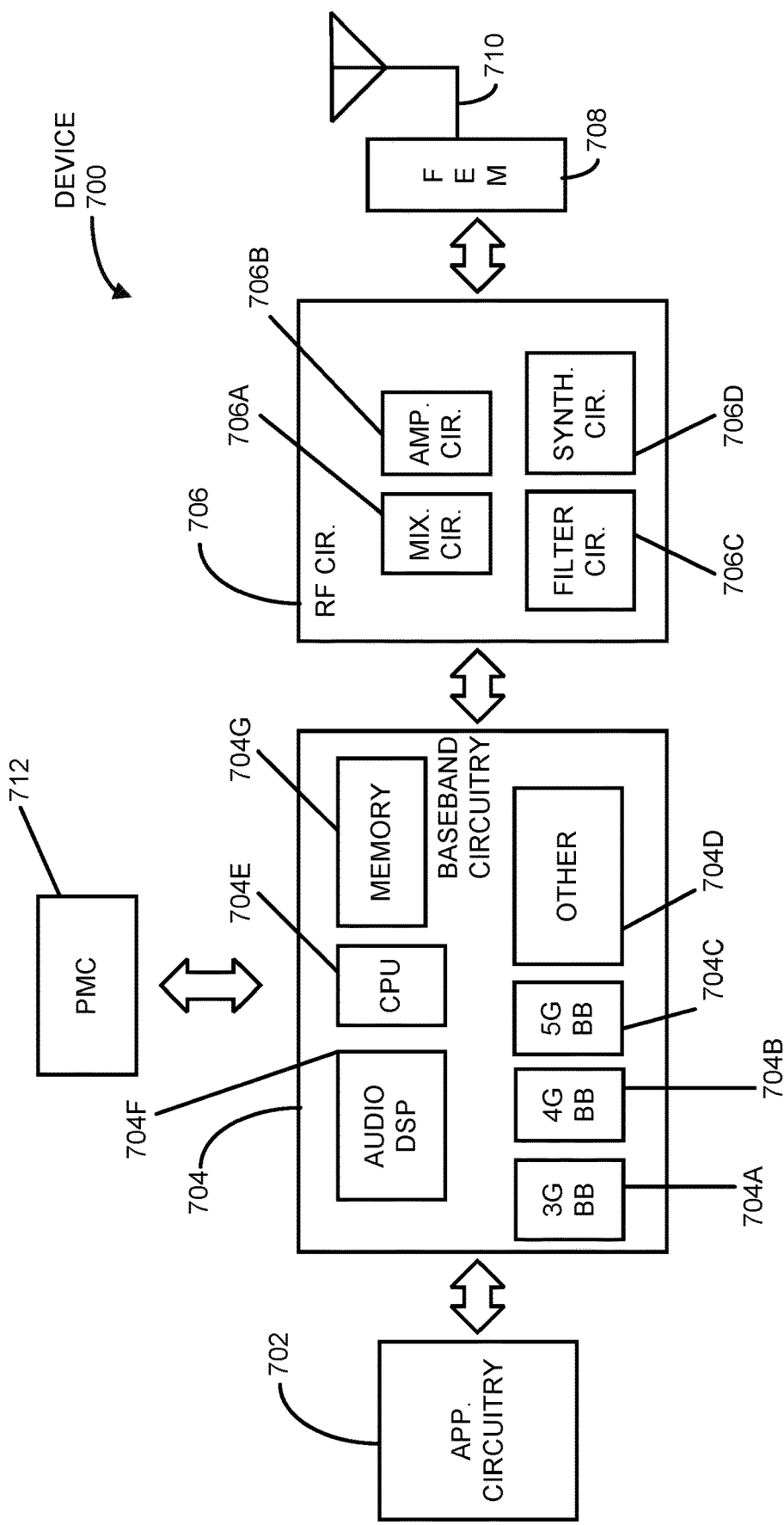
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. The RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by the filter circuitry 706C.

In some embodiments, the mixer circuitry 706A of the receive signal path and the mixer circuitry 706A of the transmit signal path may include two or more mixers and may be arranged for quadrature downconversion and upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. The FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by the RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device 700 is included in a UE. The PMC 712 may increase the power conversion efficiency while providing desirable implementation size and heat dissipation characteristics.

FIG. 7 shows the PMC 712 coupled only with the baseband circuitry 704. However, in other embodiments, the PMC 712 may be additionally or alternatively coupled with, and perform similar power management operations for, other components such as, but not limited to, the application circuitry 702, the RF circuitry 706, or the FEM circuitry 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
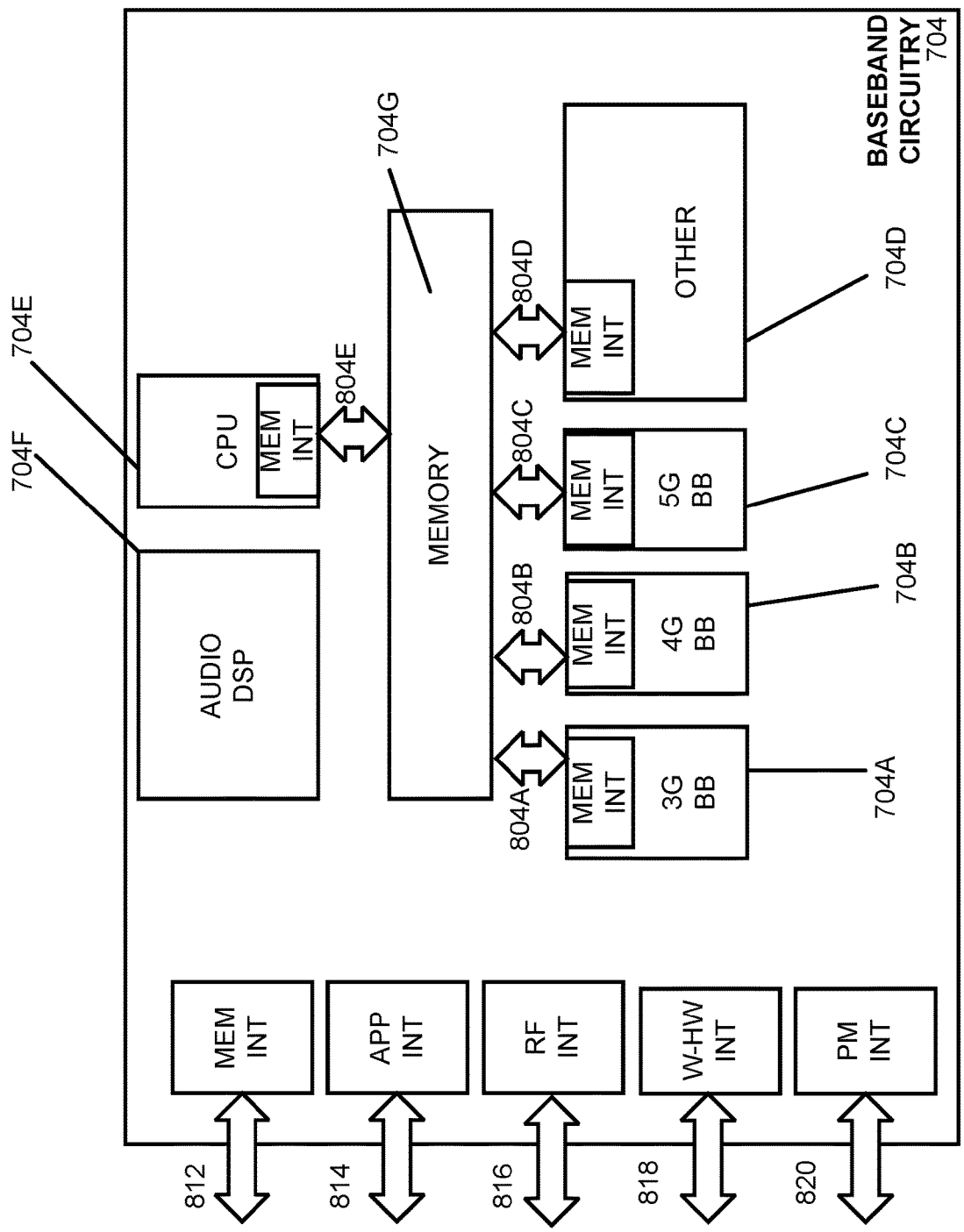
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
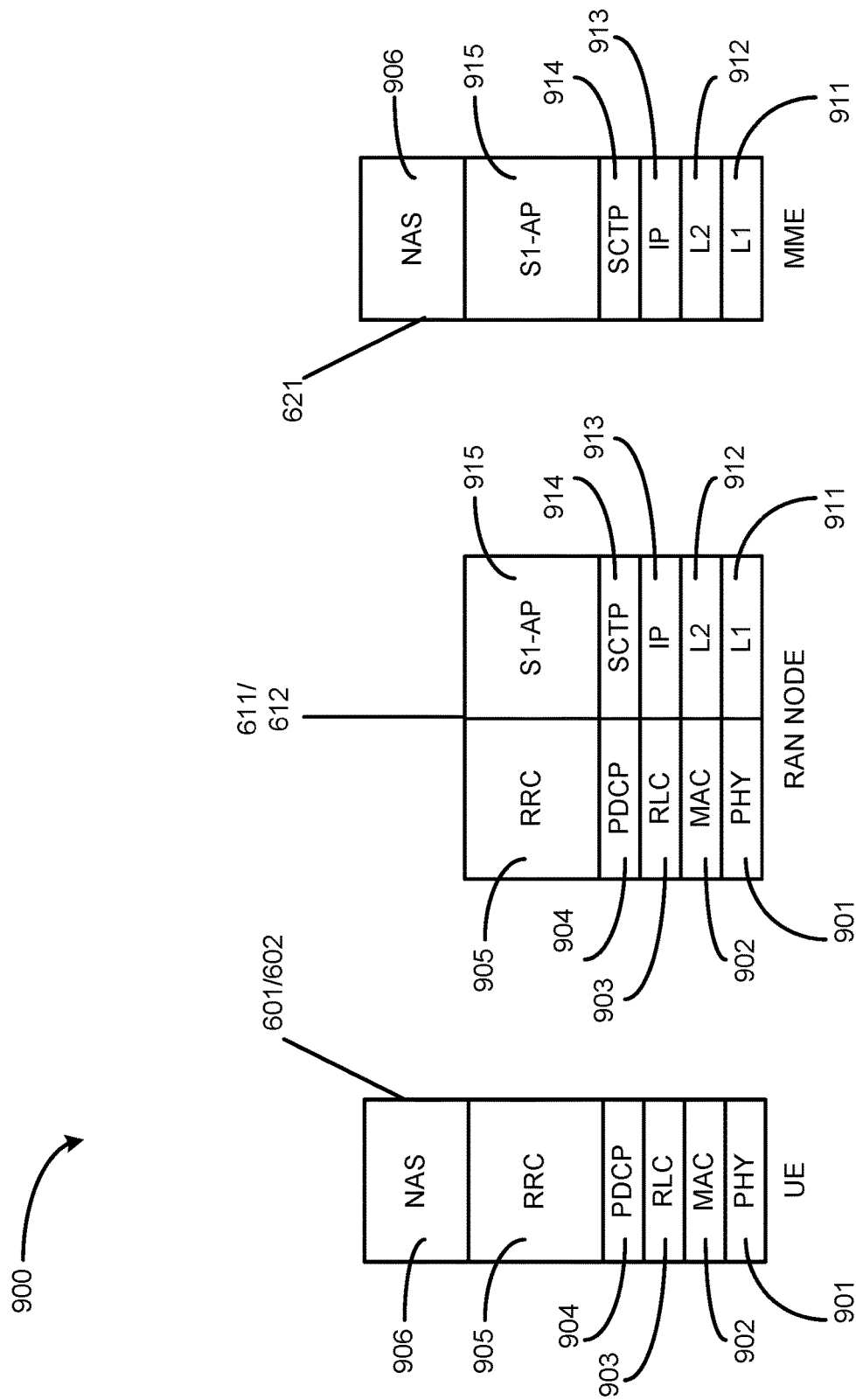
FIG. 9 is an illustration of a control plane protocol stack in accordance with some embodiments.

FIG. 9 is an illustration of a control plane protocol stack in accordance with some embodiments. In this embodiment, a control plane 900 is shown as a communications protocol stack between the UE 601 (or alternatively, the UE 602), the RAN node 611 (or alternatively, the RAN node 612), and the MME 621.

A PHY layer 901 may transmit or receive information used by the MAC layer 902 over one or more air interfaces. The PHY layer 901 may further perform link adaptation or adaptive modulation and coding (AMC), power control, cell search (e.g., for initial synchronization and handover purposes), and other measurements used by higher layers, such as an RRC layer 905. The PHY layer 901 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 902 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

An RLC layer 903 may operate in a plurality of modes of operation, including: Transparent Mode (TM), Unacknowledged Mode (UM), and Acknowledged Mode (AM). The RLC layer 903 may execute transfer of upper layer protocol data units (PDUs), error correction through automatic repeat request (ARQ) for AM data transfers, and concatenation, segmentation and reassembly of RLC SDUs for UM and AM data transfers. The RLC layer 903 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 904 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 905 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 601 and the RAN node 611 may utilize a Uu interface (e.g., an LTE-Uu interface) to exchange control plane data via a protocol stack comprising the PHY layer 901, the MAC layer 902, the RLC layer 903, the PDCP layer 904, and the RRC layer 905.

In the embodiment shown, the non-access stratum (NAS) protocols 906 form the highest stratum of the control plane between the UE 601 and the MME 621. The NAS protocols 906 support the mobility of the UE 601 and the session management procedures to establish and maintain IP connectivity between the UE 601 and the P-GW 623.

The S1 Application Protocol (S1-AP) layer 915 may support the functions of the S1 interface and comprise Elementary Procedures (EPs). An EP is a unit of interaction between the RAN node 611 and the CN 620. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) 914 may ensure reliable delivery of signaling messages between the RAN node 611 and the MME 621 based, in part, on the IP protocol, supported by an IP layer 913. An L2 layer 912 and an L1 layer 911 may refer to communication links (e.g., wired or wireless) used by the RAN node and the MME to exchange information.

The RAN node 611 and the MME 621 may utilize an S1-MME interface to exchange control plane data via a protocol stack comprising the L1 layer 911, the L2 layer 912, the IP layer 913, the SCTP layer 914, and the S1-AP layer 915.

Figure 10:
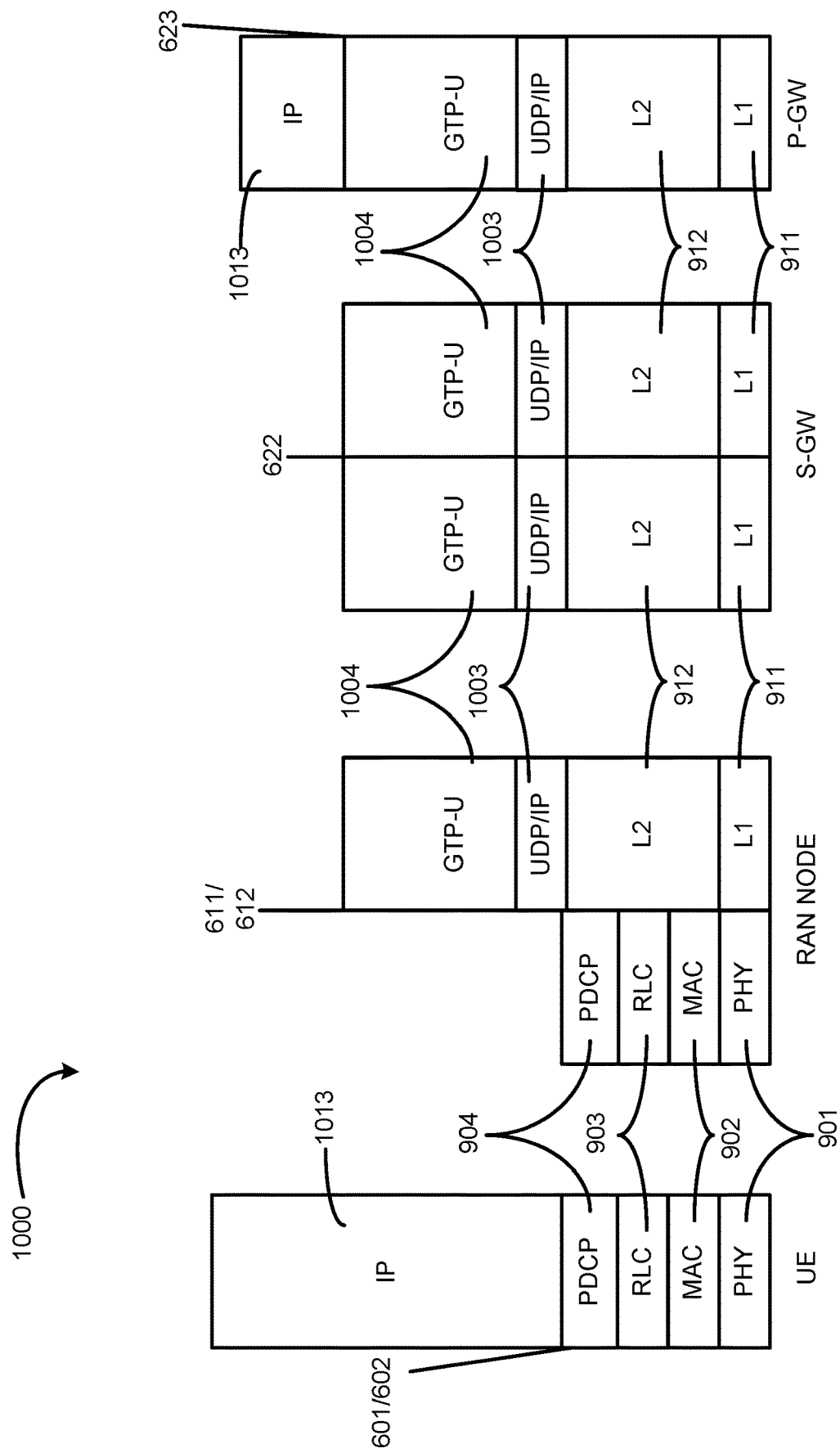
FIG. 10 is an illustration of a user plane protocol stack in accordance with some embodiments.

FIG. 10 is an illustration of a user plane protocol stack in accordance with some embodiments. In this embodiment, a user plane 1000 is shown as a communications protocol stack between the UE 601 (or alternatively, the UE 602), the RAN node 611 (or alternatively, the RAN node 612), the S-GW 622, and the P-GW 623. The user plane 1000 may utilize at least some of the same protocol layers as the control plane 900. For example, the UE 601 and the RAN node 611 may utilize a Uu interface (e.g., an LTE-Uu interface) to exchange user plane data via a protocol stack comprising the PHY layer 901, the MAC layer 902, the RLC layer 903, the PDCP layer 904.

The General Packet Radio Service (GPRS) Tunneling Protocol for the user plane (GTP-U) layer 1004 may be used for carrying user data within the GPRS core network and between the radio access network and the core network. The user data transported can be packets in any of IPv4, IPv6, or PPP formats, for example. The UDP and IP security (UDP/IP) layer 1003 may provide checksums for data integrity, port numbers for addressing different functions at the source and destination, and encryption and authentication on the selected data flows. The RAN node 611 and the S-GW 622 may utilize an S1-U interface to exchange user plane data via a protocol stack comprising the L1 layer 911, the L2 layer 912, the UDP/IP layer 1003, and the GTP-U layer 1004. The S-GW 622 and the P-GW 623 may utilize an S5/S8a interface to exchange user plane data via a protocol stack comprising the L1 layer 911, the L2 layer 912, the UDP/IP layer 1003, and the GTP-U layer 1004. As discussed above with respect to FIG. 9, NAS protocols support the mobility of the UE 601 and the session management procedures to establish and maintain IP connectivity between the UE 601 and the P-GW 623.

Figure 11:
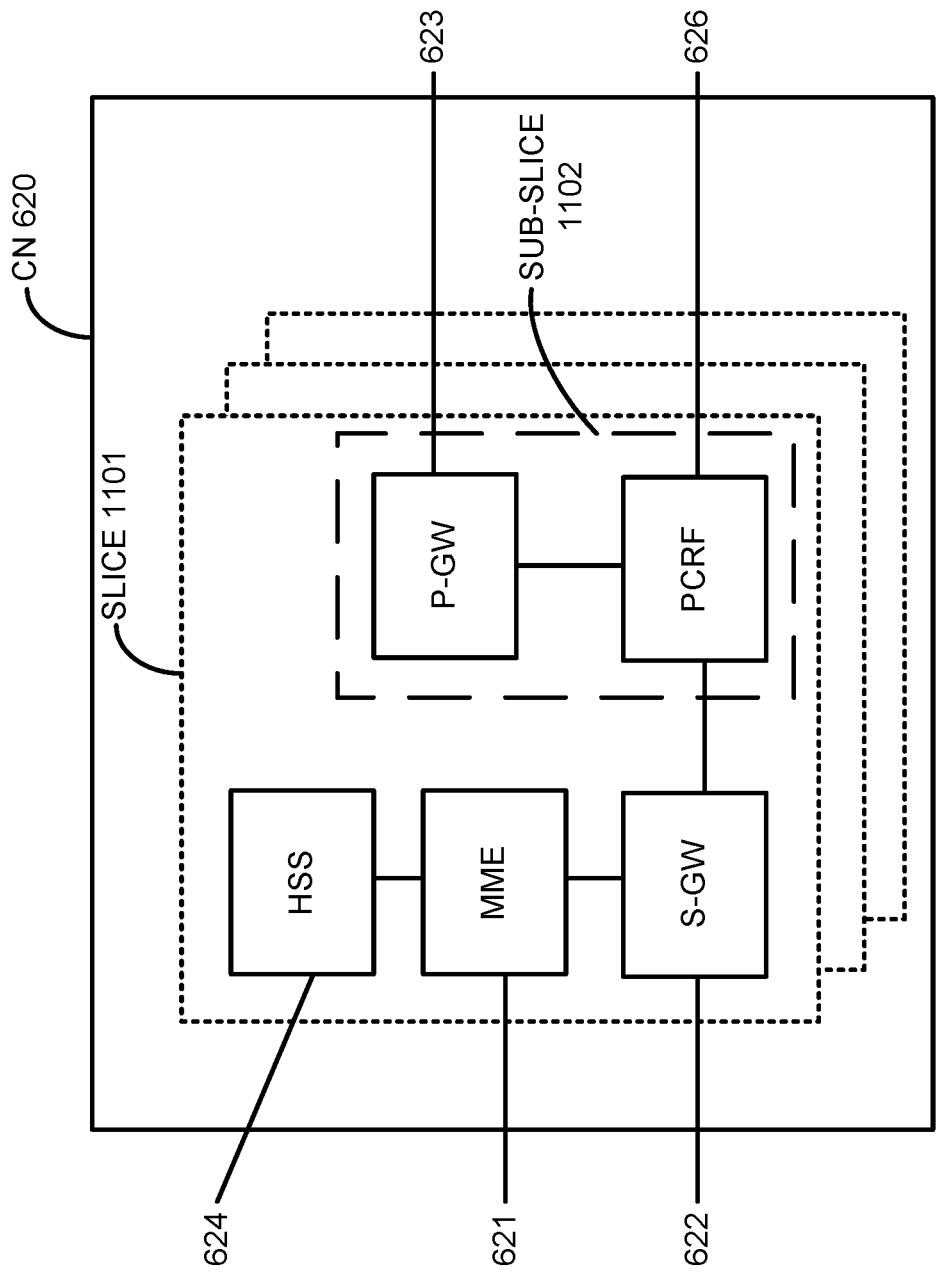
FIG. 11 illustrates components of a core network in accordance with some embodiments.

FIG. 11 illustrates components of a core network in accordance with some embodiments. The components of the CN 620 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 620 may be referred to as a network slice 1101. A logical instantiation of a portion of the CN 620 may be referred to as a network sub-slice 1102 (e.g., the network sub-slice 1102 is shown to include the PGW 623 and the PCRF 626).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 12:
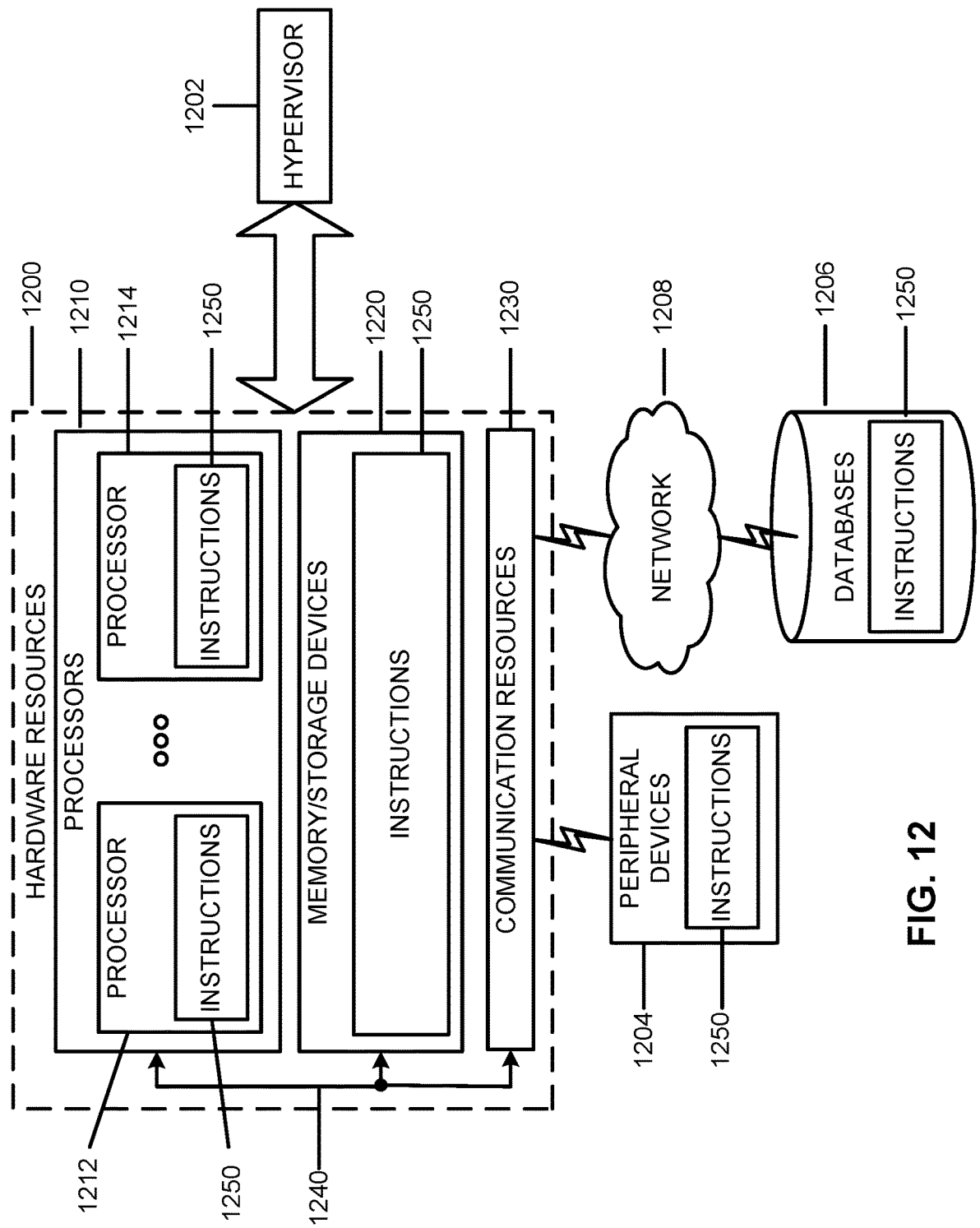
FIG. 12 is a block diagram illustrating components, according to some example embodiments.

FIG. 12 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1200 including one or more processors (or processor cores) 1210, one or more memory/storage devices 1220, and one or more communication resources 1230, each of which may be communicatively coupled via a bus 1240. For embodiments where node virtualization (e.g., NFV) is utilized, a hypervisor 1202 may be executed to provide an execution environment for one or more network slices/sub-slices to utilize the hardware resources 1200.

The processors 1210 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1212 and a processor 1214.

The memory/storage devices 1220 may include main memory, disk storage, or any suitable combination thereof. The memory/storage devices 1220 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1230 may include interconnection or network interface components or other suitable devices to communicate with one or more peripheral devices 1204 or one or more databases 1206 via a network 1208. For example, the communication resources 1230 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1250 may comprise software, a program, an application, an applet, an app, or other executable code for causing at least any of the processors 1210 to perform any one or more of the methodologies discussed herein. The instructions 1250 may reside, completely or partially, within at least one of the processors 1210 (e.g., within the processor's cache memory), the memory/storage devices 1220, or any suitable combination thereof. Furthermore, any portion of the instructions 1250 may be transferred to the hardware resources 1200 from any combination of the peripheral devices 1204 or the databases 1206. Accordingly, the memory of processors 1210, the memory/storage devices 1220, the peripheral devices 1204, and the databases 1206 are examples of computer-readable and machine-readable media.

Examples

The following is a non-exhaustive list of example embodiments that fall within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below, and the above disclosed embodiments, are not combinable, it is contemplated within the scope of the disclosure that such examples and embodiments are combinable.

Example 1 may include beam recovery and radio link failure handling in user equipment (UE) in a wireless networks is comprising:
  Layer 1 periodically indicates channel condition to layer 3;
  Layer 3 starts the first timer when N1 number of indications of bad channel are received from Layer 1;
  Layer 3 starts or restarts the second timer up to N2 times when the first timer or the second timer expires;
  Layer 3 stops the first timer or the second timer when N3 number of indications of good channel are received from Layer 1;
Wherein Layer 3 triggers Layer 1 or layer 2 to perform beam recovery procedure whenever the first timer or the second timer expires;

Example 2 may include the method of Example 1 or some other example herein, wherein indication of bad channel or good channel is generated based on the measurements on the configured beams and the associated error rate of scheduling channel.

Example 3 may include the method of Example 1 or some other example herein, wherein N1 number of indications of bad channel and N3 number of indications of good channel are consecutive ones.

Example 4: An apparatus of a user equipment (UE), comprising: a data storage device configured to store values for a first timer, a second timer, and a third timer; and one or more processors operably coupled to the data storage device, the one or more processors configured to: start the first timer responsive to detection of a Radio Link (RL) failure; start the second timer and trigger a beam recovery procedure one or more times responsive to expiry of the first timer if RL recovery is not detected; start the third timer and attempt to find a suitable cell for Radio Resource Control (RRC) connection reestablishment responsive to one or more expiries of the second timer if RL recovery fails; and go to an RRC idle state or an RRC inactive state responsive to expiry of the third timer if a suitable cell for RRC connection reestablishment is not found.

Example 5: The apparatus of Example 4, wherein the detection of the RL failure comprises detection of a predetermined number of consecutive out-of-sync indications from a physical layer to an RRC layer.

Example 6: The apparatus of Example 5, wherein the predetermined number of consecutive out of sync indications comprises three consecutive out-of-sync indications.

Example 7: The apparatus of Example 4, wherein RL recovery comprises a detection of a predetermined number of consecutive in-sync indications from a physical layer to an RRC layer.

Example 8: The apparatus of Example 7, wherein the predetermined number of consecutive in-sync indications comprises three consecutive in-sync indications.

Example 9: The apparatus of Example 4, wherein the one or more processors are further configured to stop the first timer or the second timer responsive to detection of RL recovery.

Example 10: The apparatus according to any one of Examples 4-9, wherein the one or more processors are configured to start the second timer and trigger the beam recovery procedure a predetermined number of times before the start of the third timer.

Example 11: The apparatus of Example 10, wherein: the data storage device is further configured to store a value of a counter; and the one or more processors are configured to increment the value of the counter each time the second timer starts.

Example 12: The apparatus according to any one of Examples 4-9, wherein the one or more processors are configured to start the second timer only a single time before the start of the third timer.

Example 13: The apparatus of Example 12, wherein the one or more processors are configured to trigger the beam recovery procedure a plurality of times while the second timer runs.

Example 14: An apparatus of a user equipment (UE), comprising: a data storage device configured to store values of a first timer, a second timer, a third timer, a first number, a second number, a third number, and a counter; and one or more processors operably coupled to the data storage device and configured to: start the first timer responsive to the first number of consecutive out of sync indications from a physical layer to a Radio Resource Control (RRC) layer; start the second timer, trigger a beam recovery procedure, and increment the value of the counter responsive to expiry of the first timer if the second number of in-sync indications are not received from the physical layer before expiry of the first timer; restart the second timer, trigger the beam recovery procedure, and increment the value of the counter responsive to expiry of the second timer if: the second number of consecutive in-sync indications are not received from the physical layer before expiry of the second timer; and the value of the counter is less than the value of the third number; and start the third timer and attempt to find a suitable cell for RRC connection reestablishment responsive to expiry of the second timer if: the second number of consecutive in-sync indications are not received from the physical layer before expiry of the second timer; and the value of the counter is equal to the value of the third number.

Example 15: The apparatus of Example 14, wherein an initial value of the counter is zero.

Example 16: The apparatus of Example 14, wherein the value of the third number is three.

Example 17: The apparatus according to any one of Examples 14-16, wherein the one or more processors are configured to stop the first timer or the second timer responsive to receipt of the second number of consecutive in-sync indications.

Example 18: The apparatus according to any one of Examples 14-16, wherein the one or more processors are configured to stop the third timer responsive to identification of a suitable cell for RRC connection reestablishment.

Example 19: The apparatus according to any one of Examples 14-16, wherein the one or more processors are further configured to go to an RRC idle state or an RRC inactive state responsive to expiry of the third timer if a suitable cell for RRC connection reestablishment has not been identified.

Example 20: A computer-readable storage medium having computer-readable instructions stored thereon, the computer-readable instructions configured to instruct on or more processors to: send periodic indications from a physical layer of a cellular data network to a Radio Resource Control (RRC) layer of the cellular data network, the indications comprising in-sync indications if a Radio Link (RL) is in-sync, and out-of-sync indications if the RL is out-of-sync; start a first timer responsive to a predetermined number of out-of-sync indications; start a second timer, increment a counter, and trigger the physical layer or a Media Access Control (MAC) layer to perform beam recovery if the first timer expires; restart the second timer, increment the counter, and trigger the physical layer or the MAC layer to perform beam recovery responsive to expiry of the second timer if a value of the counter is less than another predetermined value; start a third timer and attempt to find a suitable cell for RRC connection reestablishment responsive to expiry of the second timer if the value of the counter is the same as the other predetermined value; and go to an RRC idle state or an RRC inactive state responsive to expiry of the third timer.

Example 21: The computer-readable storage medium of Example 20, wherein the computer-readable instructions are configured to instruct the one or more processors to stop the first timer responsive to a certain number of consecutive in-sync indications.

Example 22: The computer-readable storage medium of Example 20, wherein the computer-readable instructions are configured to instruct the one or more processors to stop the second timer responsive to a certain number of consecutive in-sync indications.

Example 23: The computer-readable storage medium according to any one of Examples 20-22, wherein the computer-readable instructions are configured to instruct the one or more processors to stop the third timer responsive to identification of a suitable cell for RRC connection reestablishment.

Example 24: An apparatus of a user equipment (UE), comprising: a data storage device configured to store a value of a timer; and one or more processors operably coupled to the data storage device, the one or more processors configured to: perform measurements, in a physical layer, on beams; inform, by the physical layer, a layer higher than the physical layer of a status of the beams; count, in the layer higher than the physical layer, consecutive beam failure status; start, in the layer higher than the physical layer responsive to a predetermined number of the consecutive beam failure status, a beam recovery procedure and the timer; keep track, in the layer higher than the physical layer, a number of attempts of the beam recovery procedure; and start, in the layer higher than the physical layer, a radio link connection reestablishment procedure if the beam recovery procedure does not recover a beam before expiry of the timer or if the number of attempts of the beam recovery procedure reaches a predetermined number of attempts.

Example 25: The apparatus of Example 24, wherein the one or more processors are configured to, in the physical layer, determine status of beams using a calculated Physical Downlink Control Channel (PDCCH) block error rate based on a measured result of beams.

Example 26: The apparatus of Example 25, wherein the one or more processors are configured to, in the physical layer, generate and inform an in-sync indication when the calculated PDCCH block error rate is lower than a first threshold.

Example 27: The apparatus of Example 25, wherein the one or more processors are configured to, in the physical layer, generate and inform an out-of-sync indication when the calculated PDCCH block error rate is higher than a second threshold.

Example 28: The apparatus of Example 25, wherein the one or more processors are configured to, in the physical layer, use a channel quality of a best measured beam among multipole beams that are configured in PDCCH block error rate calculations.

Example 29 may include an apparatus comprising means to perform one or more elements of a method described in or related to any of Examples 1-28, or any other method or process described herein.

Example 30 may include one or more non-transitory computer-readable media comprising instructions to cause an electronic device, upon execution of the instructions by one or more processors of the electronic device, to perform one or more elements of a method described in or related to any of Examples 1-28, or any other method or process described herein.

Example 31 may include an apparatus comprising logic, modules, or circuitry to perform one or more elements of a method described in or related to any of Examples 1-28, or any other method or process described herein.

Example 32 may include a method, technique, or process as described in or related to any of Examples 1-28, or portions or parts thereof.

Example 33 may include an apparatus comprising: one or more processors and one or more computer readable media comprising instructions that, when executed by the one or more processors, cause the one or more processors to perform the method, techniques, or process as described in or related to any of Examples 1-28, or portions thereof.

Example 34 may include a method of communicating in a wireless network as shown and described herein.

Example 35 may include a system for providing wireless communication as shown and described herein.

Example 36 may include a device for providing wireless communication as shown and described herein.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It will be apparent to those having skill in the art that many changes may be made to the details of the above-described embodiments without departing from the underlying principles of the disclosure. The scope of the present disclosure should, therefore, be determined by the following claims.

The invention claimed is:

1. An apparatus of a user equipment (UE), comprising:
a data storage device configured to store a value of a timer; and
one or more processors operably coupled to the data storage device, the one or more processors configured to:
during a period based on the timer, perform measurements, in a physical layer, on beams corresponding to radio link monitoring (RLM) reference signal resources;
determine a status of beams using a calculated Physical Downlink Control Channel (PDCCH) block error rate based on the measurements;
compare the calculated PDCCH block error rate to a first threshold to determine whether the status of the beams is in-sync;
compare the calculated PDCCH block error rate to a second threshold to determine the status of the beams as out-of-sync; and
inform, by the physical layer, a layer higher than the physical layer of the status of the beams including both in-sync indications and out-of-sync indications.

2. The apparatus of claim 1, wherein the one or more processors are configured to, in the physical layer, generate and inform an in-sync indication when the calculated PDCCH block error rate is lower than the first threshold.

3. The apparatus of claim 1, wherein the one or more processors are configured to, in the physical layer, generate and inform an out-of-sync indication when the calculated PDCCH block error rate is higher than the second threshold.

4. The apparatus of claim 1, wherein the one or more processors are configured to, in the physical layer, use a channel quality of a best measured beam among multiple beams that are configured in PDCCH block error rate calculations.

5. A non-transitory computer-readable medium including computer-readable instructions that, when executed by one or more processors, cause the one or more processors to:
perform measurements, in a physical layer of a user equipment (UE), on beams corresponding to radio link monitoring (RLM) reference signal resources;
determine a status of beams using a calculated Physical Downlink Control Channel (PDCCH) block error rate based on the measurements;
compare the calculated PDCCH block error rate to a first threshold to determine whether the status of the beams is in-sync;
compare the calculated PDCCH block error rate to a second threshold to determine the status of the beams as out-of-sync; and
inform a layer higher than the physical layer of the status of the beams including both in-sync indications and out-of-sync indications.

6. The non-transitory computer-readable medium of claim 5, wherein the computer-readable instructions, when executed, further cause the one or more processors to generate and inform an in-sync indication when the calculated PDCCH block error rate is lower than the first threshold.

7. The non-transitory computer-readable medium of claim 5, wherein the computer-readable instructions, when executed, further cause the one or more processors to generate and inform an out-of-sync indication when the calculated PDCCH block error rate is higher than the second threshold.

8. The non-transitory computer-readable medium of claim 5, wherein the computer-readable instructions, when executed, further cause the one or more processors to use a channel quality of a best measured beam among multiple beams that are configured in PDCCH block error rate calculations.

9. An apparatus comprising means to:
perform measurements, in a physical layer of a user equipment (UE), on beams corresponding to radio link monitoring (RLM) reference signal resources;
determine a status of beams using a calculated Physical Downlink Control Channel (PDCCH) block error rate based on the measurements;
compare the calculated PDCCH block error rate to a first threshold to determine whether the status of the beams is in-sync;
compare the calculated PDCCH block error rate to a second threshold to determine the status of the beams as out-of-sync; and
inform, by the physical layer, a layer higher than the physical layer of the status of the beams including both in-sync indications and out-of-sync indications.

10. The apparatus of claim 9, further comprising means to, in the physical layer, generate and inform an in-sync indication when the calculated PDCCH block error rate is lower than the first threshold.

11. The apparatus of claim 9, further comprising means to, in the physical layer, generate and inform an out-of-sync indication when the calculated PDCCH block error rate is higher than the second threshold.

12. The apparatus of claim 9, further comprising means to, in the physical layer, use a channel quality of a best measured beam among multiple beams that are configured in PDCCH block error rate calculations.

* * * * *